(12) United States Patent
Motomitsu

(10) Patent No.: US 12,370,838 B2
(45) Date of Patent: Jul. 29, 2025

(54) PNEUMATIC TIRE

(71) Applicant: The Yokohama Rubber Co., LTD., Tokyo (JP)

(72) Inventor: Takamasa Motomitsu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 662 days.

(21) Appl. No.: 17/632,744

(22) PCT Filed: Jul. 31, 2020

(86) PCT No.: PCT/JP2020/029569
§ 371 (c)(1),
(2) Date: Feb. 3, 2022

(87) PCT Pub. No.: WO2021/024963
PCT Pub. Date: Feb. 11, 2021

(65) Prior Publication Data
US 2022/0288973 A1   Sep. 15, 2022

(30) Foreign Application Priority Data
Aug. 8, 2019 (JP) ................. 2019-146850

(51) Int. Cl.
*B60C 11/12* (2006.01)
*B60C 11/03* (2006.01)
*B60C 11/13* (2006.01)

(52) U.S. Cl.
CPC .......... *B60C 11/13* (2013.01); *B60C 11/0306* (2013.01); *B60C 11/1259* (2013.01);
(Continued)

(58) Field of Classification Search
CPC ............... B60C 2011/1231; B60C 2011/0362
See application file for complete search history.

(56) References Cited

U.S. PATENT DOCUMENTS 4,078,596 A * 3/1978 Nakayama .............. B60C 11/04
152/DIG. 3
6,340,040 B1 * 1/2002 Ikeda ................... B60C 11/0306
152/209.27
(Continued)

FOREIGN PATENT DOCUMENTS

CN   108501624 A   9/2018
CN   108883667 A   11/2018
(Continued)

OTHER PUBLICATIONS

Machine Translation: JP-06262909-A, Hiruma M, (Year: 2024).*
(Continued)

*Primary Examiner* — Kendra Ly
(74) *Attorney, Agent, or Firm* — Thorpe North & Western

(57) ABSTRACT

A pneumatic tire includes a pair of circumferential main grooves extending in a tire circumferential direction, and a pair of shoulder land portions and a single center land portion defined and formed by the circumferential main grooves. In addition, the center land portion includes a plurality of center narrow shallow grooves extending through the center land portion in a tire width direction. A groove depth H21 of the center narrow shallow groove is in a range $0.025 \leq H21/Hg \leq 0.150$ with respect to a maximum groove depth Hg of the circumferential main groove.

16 Claims, 10 Drawing Sheets

(52) U.S. Cl.
CPC ...... *B60C 11/1263* (2013.01); *B60C 11/1281* (2013.01); *B60C 11/1369* (2013.01); *B60C 2011/0348* (2013.01); *B60C 2011/0351* (2013.01); *B60C 2011/0353* (2013.01); *B60C 2011/0355* (2013.01); *B60C 2011/036* (2013.01); *B60C 2011/0362* (2013.01); *B60C 2011/0365* (2013.01); *B60C 2011/0367* (2013.01); *B60C 2011/0369* (2013.01); *B60C 2011/0372* (2013.01); *B60C 2011/1213* (2013.01); *B60C 2011/1231* (2013.01)

(56) References Cited

U.S. PATENT DOCUMENTS

| | | | | |
|---|---|---|---|---|
| 2006/0269636 | A1* | 11/2006 | Miyamae | B60C 11/0309 425/35 |
| 2010/0193096 | A1* | 8/2010 | Hashimoto | B60C 11/1376 152/209.18 |
| 2014/0246134 | A1* | 9/2014 | Hironaka | B60C 11/24 152/154.2 |
| 2018/0236820 | A1 | 8/2018 | Hamanaka | |
| 2019/0054773 | A1 | 2/2019 | Yamaguchi | |
| 2019/0111737 | A1* | 4/2019 | Motomitsu | B60C 11/0327 |
| 2019/0126688 | A1 | 5/2019 | Harle et al. | |

FOREIGN PATENT DOCUMENTS

| | | | | | |
|---|---|---|---|---|---|
| JP | 06262909 | A | * | 9/1994 | |
| JP | 7-81323 | A | | 3/1995 | |
| JP | 07081323 | A | * | 3/1995 | |
| JP | 11-78433 | A | | 3/1999 | |
| JP | 2000247112 | A | * | 9/2000 | |
| JP | 2009-227264 | A | | 10/2009 | |
| JP | 2016-159861 | A | | 9/2016 | |
| JP | 2018-134915 | A | | 8/2018 | |
| WO | 2015/004913 | A1 | | 1/2015 | |
| WO | 2017/170788 | A1 | | 10/2017 | |
| WO | 2017/170946 | A1 | | 10/2017 | |
| WO | WO-2017170562 | A1 | * | 10/2017 | ............. B60C 11/03 |
| WO | 2018/037941 | A1 | | 3/2018 | |

OTHER PUBLICATIONS

Machine Translation: JP-07081323-A, Fukushima M, (Year: 2024).*
Machine Translation: JP-2000247112-A, Ishiyama M, (Year: 2024).*
https://www.michelinearthmover.com/eng_ca/tyres-straddle-carriers/michelin-x-straddle/81222.
https://tire.bridgestone.co.jp/tb/truck_bus/catalog/industrial-truck/premises-dump_straddle-carrier/vchr/index.html.

* cited by examiner

A-CROSS-SECTIONAL VIEW

B-CROSS-SECTIONAL VIEW

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|
| Wg/TW | 0.15 | 0.15 | 0.15 | 0.15 | 0.15 | 0.15 | 0.15 | 0.15 | 0.15 | 0.15 | 0.15 |
| Wb2/TW | 0.40 | 0.40 | 0.40 | 0.40 | 0.40 | 0.40 | 0.40 | 0.40 | 0.40 | 0.40 | 0.40 |
| CENTER NARROW SHALLOW GROOVE | NO | YES | YES | YES | YES | YES | YES | YES | YES | YES | YES |
| W21 (mm) | - | 2.0 | 2.0 | 2.0 | 2.0 | 2.5 | 4.0 | 6.0 | 2.5 | 2.5 | 2.5 |
| H21 (mm) | - | 7.5 | 7.5 | 5.0 | 2.5 | 2.5 | 2.5 | 2.5 | 2.5 | 2.5 | 2.5 |
| H21/Hg | - | 0.150 | 0.150 | 0.100 | 0.050 | 0.050 | 0.050 | 0.050 | 0.050 | 0.050 | 0.050 |
| CENTER BENT GROOVE | NO | NO | YES | YES | YES | YES | YES | YES | YES | YES | YES |
| W22 (mm) | - | - | 5.0 | 5.0 | 5.0 | 5.0 | 5.0 | 5.0 | 5.0 | 5.0 | 5.0 |
| H22 (mm) | - | - | 30 | 30 | 30 | 30 | 30 | 30 | 35 | 40 | 45 |
| H22/Hg | - | - | 0.60 | 0.60 | 0.60 | 0.60 | 0.60 | 0.60 | 0.70 | 0.80 | 0.90 |
| SHOULDER NARROW SHALLOW GROOVE | NO | NO | NO | NO | NO | NO | NO | NO | NO | NO | NO |
| W11 (mm) | - | - | - | - | - | - | - | - | - | - | - |
| H11 (mm) | - | - | - | - | - | - | - | - | - | - | - |
| H11/Hg | - | - | - | - | - | - | - | - | - | - | - |
| CIRCUMFERENTIAL NARROW GROOVE | NO | NO | NO | NO | NO | NO | NO | NO | NO | NO | NO |
| W23 (mm) | - | - | - | - | - | - | - | - | - | - | - |
| H23 (mm) | - | - | - | - | - | - | - | - | - | - | - |
| H23/Hg | - | - | - | - | - | - | - | - | - | - | - |
| HEAT BUILD-UP RESISTANCE PERFORMANCE | 100 | 110 | 130 | 125 | 120 | 125 | 130 | 130 | 135 | 140 | 145 |
| UNEVEN WEAR RESISTANCE PERFORMANCE | 100 | 99 | 98 | 110 | 120 | 118 | 115 | 100 | 112 | 110 | 105 |

FIG. 11

|  | EXAMPLE 11 | EXAMPLE 12 | EXAMPLE 13 | EXAMPLE 14 | EXAMPLE 15 | EXAMPLE 16 | EXAMPLE 17 | EXAMPLE 18 | EXAMPLE 19 |
|---|---|---|---|---|---|---|---|---|---|
| Wg/TW | 0.15 | 0.15 | 0.15 | 0.15 | 0.15 | 0.15 | 0.15 | 0.08 | 0.08 |
| Wb2/TW | 0.40 | 0.40 | 0.40 | 0.40 | 0.40 | 0.35 | 0.50 | 0.40 | 0.40 |
| CENTER NARROW SHALLOW GROOVE | Yes | Yes | Yes | Yes | Yes | Yes | Yes | Yes | Yes |
| W21 (mm) | 2.5 | 2.5 | 2.5 | 2.5 | 2.5 | 2.5 | 2.5 | 2.5 | 2.5 |
| H21 (mm) | 2.5 | 2.5 | 2.5 | 2.5 | 2.5 | 2.5 | 2.5 | 2.5 | 2.5 |
| H21/Hg | 0.050 | 0.050 | 0.050 | 0.050 | 0.050 | 0.050 | 0.050 | 0.050 | 0.050 |
| CENTER BENT GROOVE | YES | YES | YES | YES | YES | YES | YES | YES | YES |
| W22 (mm) | 5.0 | 5.0 | 5.0 | 5.0 | 5.0 | 5.0 | 5.0 | 5.0 | 5.0 |
| H22 (mm) | 40 | 40 | 40 | 40 | 40 | 40 | 40 | 40 | 40 |
| H22/Hg | 0.80 | 0.80 | 0.80 | 0.80 | 0.80 | 0.80 | 0.80 | 0.80 | 0.80 |
| SHOULDER NARROW SHALLOW GROOVE | YES | YES | YES | YES | YES | YES | YES | YES | YES |
| W11 (mm) | 2.0 | 2.0 | 2.0 | 2.5 | 6.0 | 2.5 | 2.5 | 2.5 | 2.5 |
| H11 (mm) | 7.5 | 5.0 | 2.5 | 2.5 | 2.5 | 2.5 | 2.5 | 2.5 | 2.5 |
| H11/Hg | 0.150 | 0.100 | 0.050 | 0.050 | 0.050 | 0.050 | 0.050 | 0.050 | 0.050 |
| CIRCUMFERENTIAL NARROW GROOVE | NO | NO | NO | NO | NO | NO | NO | NO | YES |
| W23 (mm) | - | - | - | - | - | - | - | - | 5 |
| W23 (mm) | - | - | - | - | - | - | - | - | 40 |
| H23/Hg | - | - | - | - | - | - | - | - | 0.80 |
| HEAT BUILD-UP RESISTANCE PERFORMANCE | 145 | 140 | 135 | 140 | 142 | 145 | 135 | 140 | 150 |
| UNEVEN WEAR RESISTANCE PERFORMANCE | 110 | 120 | 125 | 120 | 100 | 115 | 130 | 120 | 130 |

FIG. 12

PNEUMATIC TIRE

TECHNICAL FIELD

The technology relates to a pneumatic tire and particularly relates to a pneumatic tire that can provide improved heat build-up resistance performance of the tire while maintaining uneven wear resistance performance of the tire.

BACKGROUND ART

For example, construction vehicle tires mounted on a port straddle carrier have a problem in that the tires are likely to suffer uneven wear due to lateral swaying of the mounting vehicle attributed to the high vehicle height of the mounting vehicle. Thus, in order to enhance the uneven wear resistance performance of the tire, known construction vehicle tires employ a tread pattern including a pair of circumferential main grooves, and a pair of shoulder land portions and a single center land portion that are defined and formed by the circumferential main grooves. Construction vehicle tires employing the above-described configuration are known (see, e.g., Internet URLs (Uniform Resource Locators): https://www.michelinearthmover.com/eng_ca/tyres-straddle-carriers/michelin-x-straddle/81222 and https://tire-.bridgestone.co.jp/tb/truck_bus/catalog/industrial-truck/premises-dump straddle-carrier/vchr/index.html).

On the other hand, for recent construction vehicle tires, there has been a requirement to enable high-speed traveling at approximately 25 km/h on a paved road. Accordingly, there is a demand for suppressing heat build-up of the tire during high-speed traveling.

SUMMARY

The technology provides a pneumatic tire that can provide improved heat build-up resistance performance of the tire while maintaining uneven wear resistance performance of the tire.

An embodiment of the technology provides a pneumatic tire comprising a pair of circumferential main grooves extending in a tire circumferential direction and a pair of shoulder land portions and a single center land portion defined and formed by the circumferential main grooves, the center land portion comprising a plurality of center narrow shallow grooves extending through the center land portion in a tire width direction, and a groove depth H21 of the center narrow shallow groove being in a range $0.025 \leq H21/Hg \leq 0.150$ with respect to a maximum groove depth Hg of the circumferential main groove.

In the pneumatic tire according to an embodiment of the technology, (1) the single center land portion is disposed, thus increasing the rigidity of a tread portion to reduce lateral swaying of the vehicle. This has the advantage of suppressing uneven wear caused by lateral swaying to improve uneven wear resistance performance of the tire. Additionally, (2) the center land portion comprises the plurality of center narrow shallow grooves extending through the center land portion, and thus there is an advantage that the cooling action of the center narrow shallow grooves improves the heat build-up resistance performance of the tire. Additionally, (3) there is an advantage that the above-described lower limit of the ratio H21/Hg ensures the cooling action of the center narrow shallow grooves, whereas the above-described upper limit of the ratio H21/Hg ensures the rigidity of the tread portion.

BRIEF DESCRIPTION OF DRAWINGS

FIG. 11 is a table indicating the results of performance tests of pneumatic tires according to embodiments of the technology.

FIG. 12 is a table showing the results of performance tests of pneumatic tires according to embodiments of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Pneumatic Tire

Figure 1:
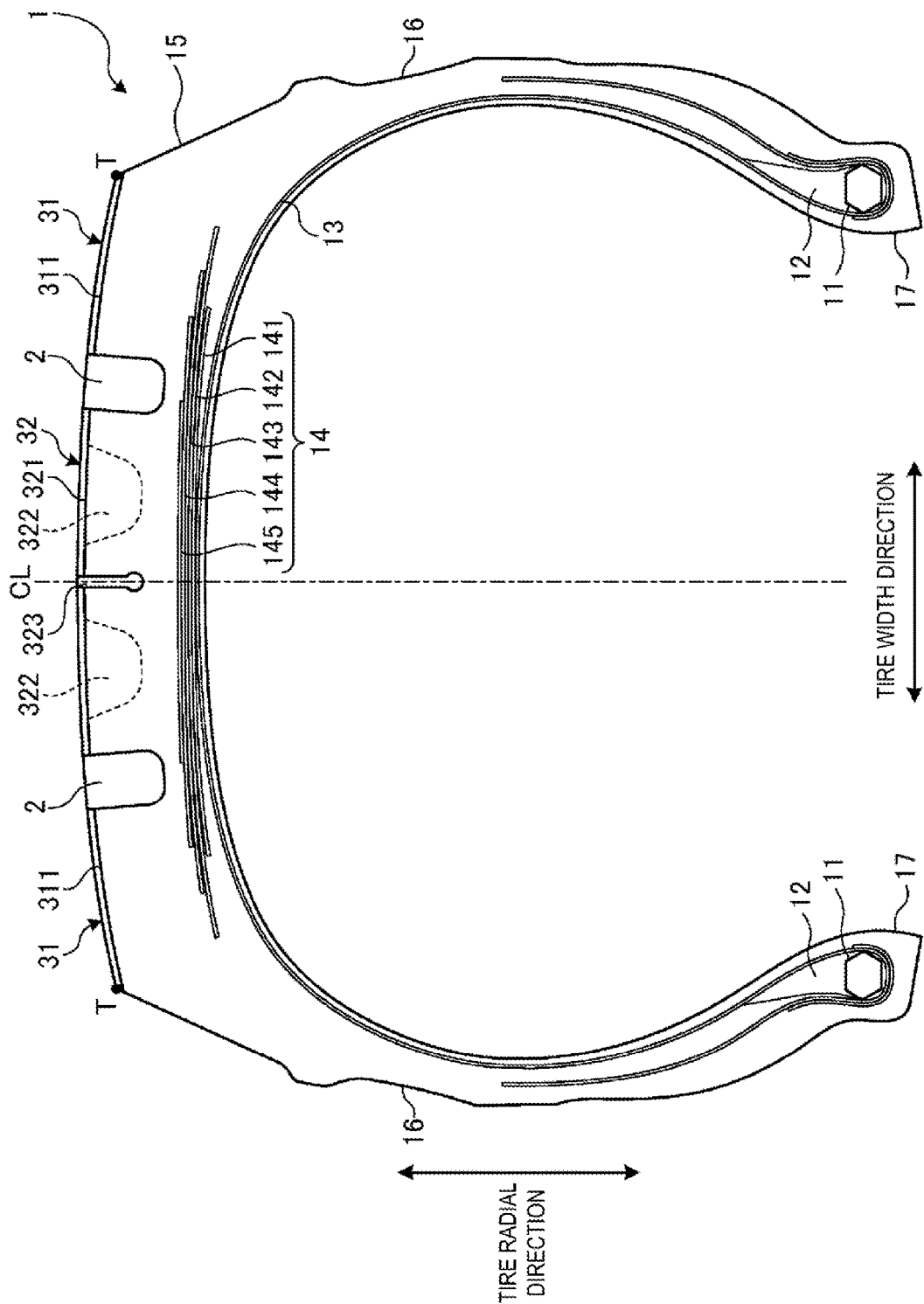
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates, as an example of a pneumatic tire, a construction vehicle tire referred to as an off the road tire (OR tire).

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by the Japan Automobile Tyre Manufacturers Association, Inc. (JATMA). Additionally, a tire width direction is defined as a direction parallel to the tire rotation axis, and the tire radial direction is defined as a direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. The carcass ply of the carcass layer 13 is formed by performing a rolling process on a plurality of coating rubber-covered carcass cords made from steel and has a cord angle (defined as the inclination angle in the longitudinal direction of the carcass cords with respect to the tire circumferential direction) being 80° or more and 110° or less. Additionally, the cord diameter of the carcass cord is within a range 1.5 mm or more and 2.5 mm or less.

The belt layer 14 is a multilayer structure including a plurality of belt plies 141 to 145 and is disposed around the outer circumference of the carcass layer 13. In particular, in an OR tire, four to eight belt plies (five in FIG. 1) are layered to form the belt layer 14. Additionally, each of the belt plies 141 to 145 is formed by covering a steel cord with coating rubber and performing a rolling process on the steel cord. Additionally, the belt plies 141 to 145 each have cord angles (defined as the inclination angle in the longitudinal direction of the belt cords with respect to the tire circumferential direction) of opposite signs with respect to adjacent belt plies, and are layered such that the inclination directions of the belt cords are alternately reversed. Thus, a cross-ply structure is formed to increase the structural strength of the belt layer 14. Additionally, the outer diameter of the belt cord is within a range 1.5 mm or more and 2.5 mm or less.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions.

Tread Pattern

Figure 2:
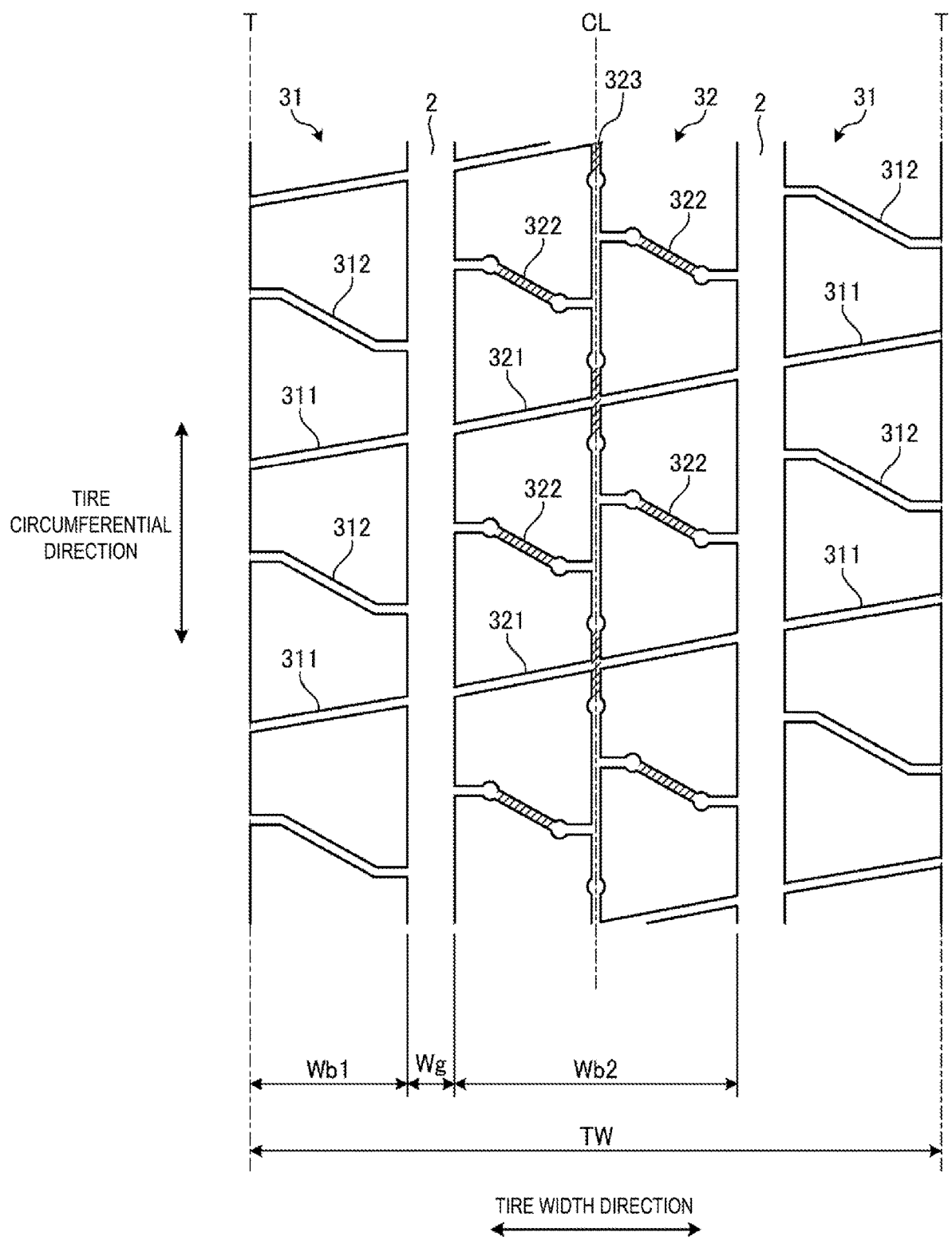
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of a radial tire for a port straddle carrier, as an example. In the same drawing, "tire circumferential direction" refers to the direction about the tire rotation axis. Additionally, the reference sign T denotes a tire ground contact edge, and dimension symbol TW denotes a tire ground contact width. Note that in FIG. 2, hatching is illustrated in a narrow groove portion having a groove depth deeper than that of center narrow shallow grooves 321 described below.

As illustrated in FIG. 2, the pneumatic tire 1 includes, in the tread surface, a plurality of circumferential main grooves 2, 2 extending in the tire circumferential direction and a pair of shoulder land portions 31, 31 and a single center land portion 32 that are defined by these circumferential main grooves 2, 2.

"Main groove" refers to a groove on which a wear indicator should be provided as specified by JATMA and has a groove width of 20 mm or more and a groove depth of 40 mm or more.

The groove width is measured as a distance between groove walls opposed to each other in a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is measured as a distance from the tread contact surface to a groove bottom when the tire is mounted on a specified rim, inflated to a specified internal pressure, and in an unloaded state. Additionally, in a configuration in which a groove bottom includes, on part thereof, a raised bottom portion, a sipe, or a recess/protrusion portion, the groove depth is measured excluding the raised bottom portion, the sipe, and the recess/protrusion portion.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

For example, in the configuration of FIG. 2, the pneumatic tire 1 has an approximately point symmetric tread pattern having a center point on the tire equatorial plane CL. Additionally, a left region and a right region demarcated by the tire equatorial plane CL each have the single circumferential main groove 2, 2. The circumferential main grooves 2, 2 have a straight shape and are disposed left-right symmetrically with respect to the tire equatorial plane CL. Additionally, the pair of shoulder land portions 31, 31 and the single center land portion 32 are defined by the circumferential main grooves 2, 2. In addition, the center land portion 32 is disposed on the tire equatorial plane CL.

Additionally, a groove width Wg of the circumferential main groove 2 is preferably in the range $0.05 \leq Wg/TW \leq 0.10$ with respect to the tire ground contact width TW.

The tire ground contact width TW is measured as a maximum linear distance in the tire axial direction of a contact surface of the tire and a flat plate when the tire is mounted on a specified rim, inflated to a specified internal pressure, placed perpendicular to the flat plate in a static state, and subjected to a load corresponding to a specified load.

Additionally, in FIG. 2, a maximum ground contact width Wb2 of the shoulder land portion 31 is preferably in the range $0.15 \leq Wb1/TW \leq 0.35$ and more preferably in the range $0.20 \leq Wb1/TW \leq 0.30$ with respect to the tire ground contact width TW. In addition, a maximum ground contact width Wb2 of the center land portion 32 in the tire width direction is preferably in the range $0.35 \leq Wb2/TW \leq 0.50$, and more preferably in the range $0.40 \leq Wb2/TW \leq 0.45$ with respect to the tire ground contact width TW.

The ground contact widths Wb1, Wb2 of the land portions are each measured as a linear distance in the tire axial direction at a contact surface between the land portion and a flat plate when the tire is mounted on a specified rim, inflated to a specified internal pressure, placed perpendicular to the flat plate in a static state, and loaded with a load corresponding to a specified load.

Center Land Portion

Figure 3:
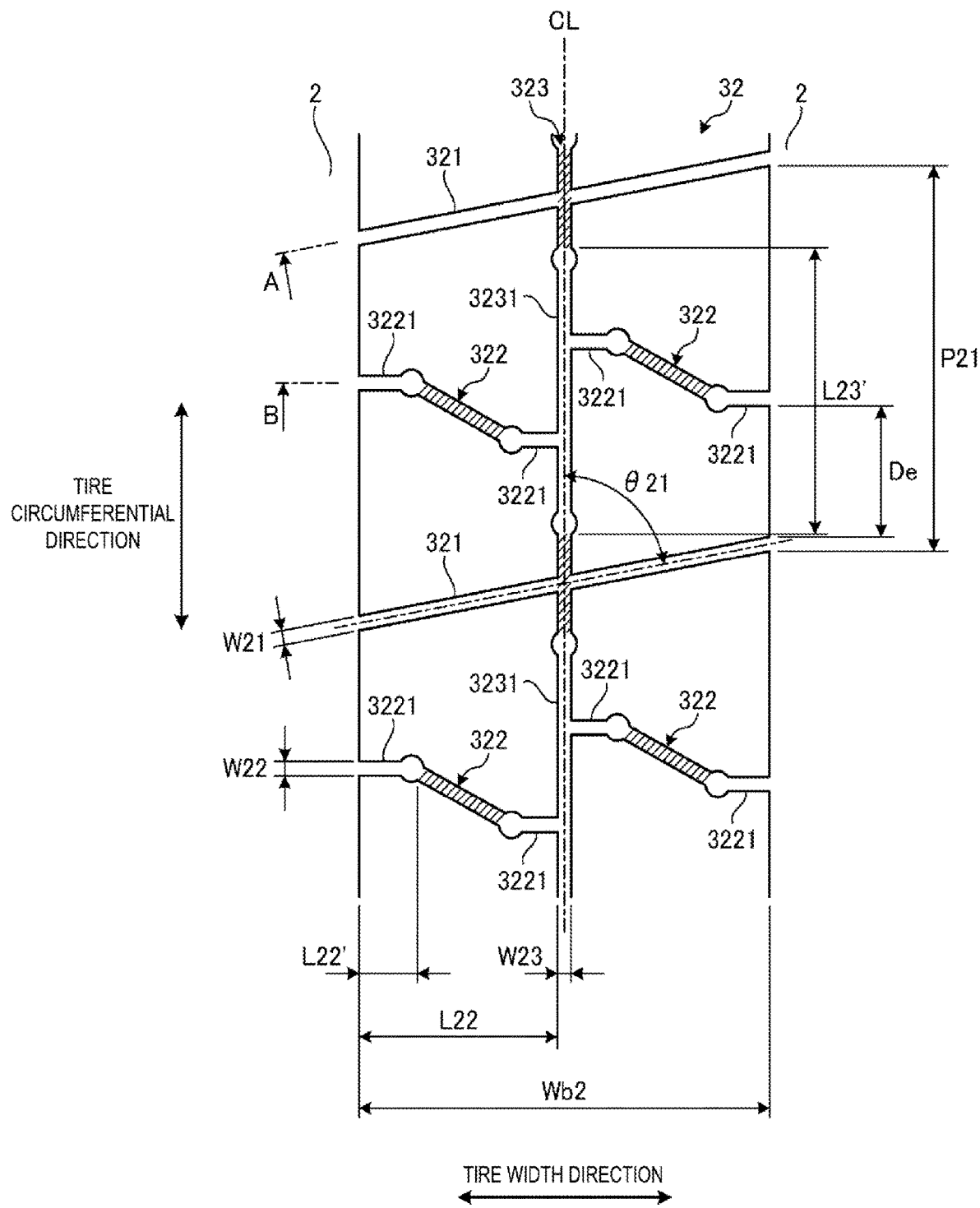
FIG. 3 is an enlarged view illustrating a center land portion of the pneumatic tire illustrated in FIG. 2.
Figure 4:
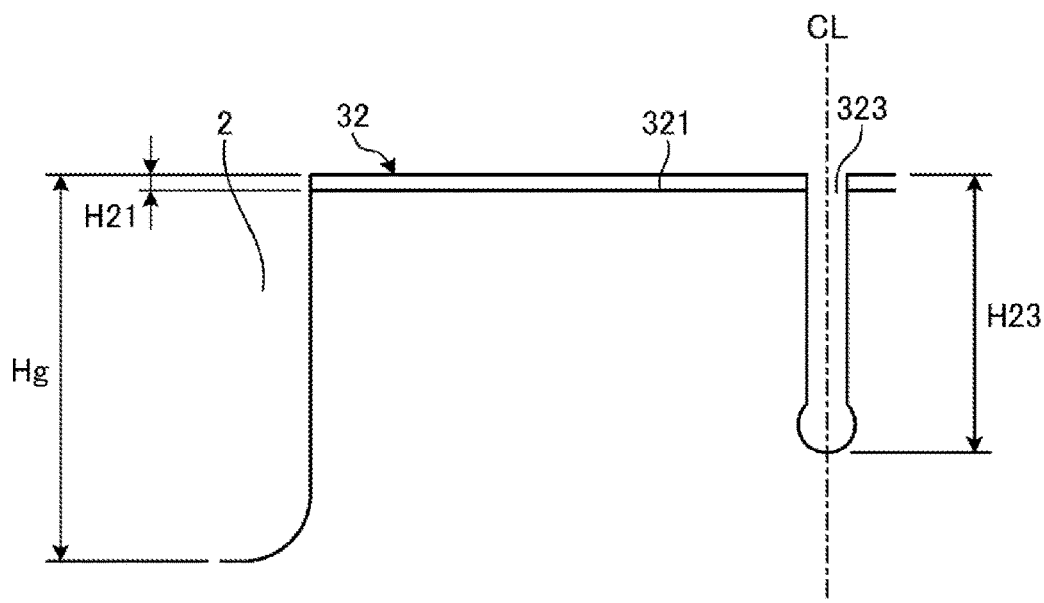
FIG. 4 is a cross-sectional view of the center land portion illustrated in FIG. 3, the view being taken along a line A.
Figure 5:
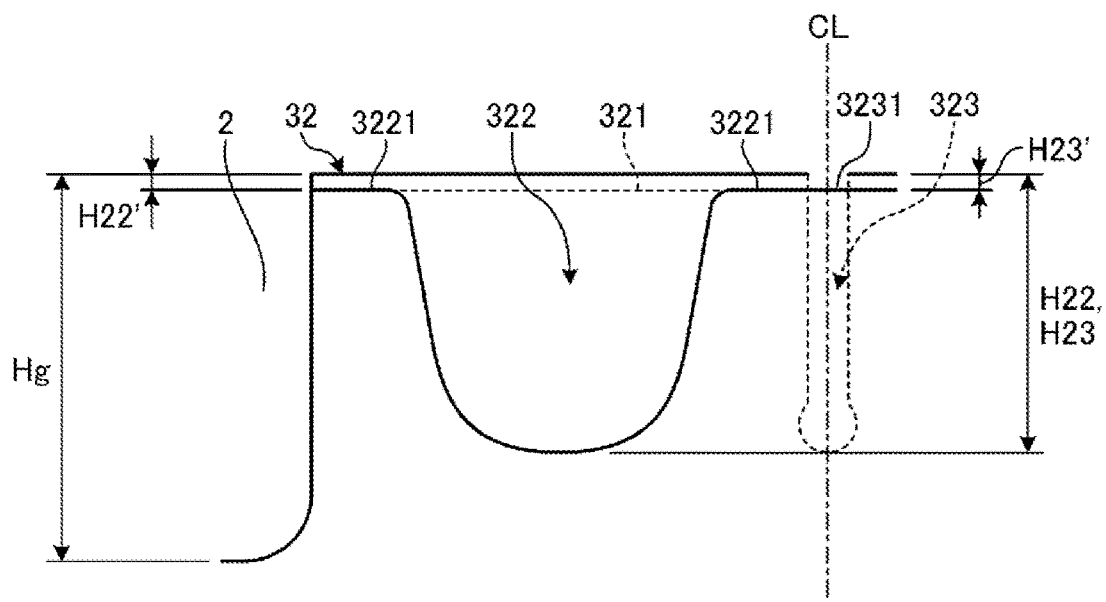
FIG. 5 is a cross-sectional view of the center land portion illustrated in FIG. 3, the view being taken along a line B.

FIG. 3 is an enlarged view illustrating the center land portion of the pneumatic tire illustrated in FIG. 2. FIGS. 4 and 5 are cross-sectional views of the center land portion 32 illustrated in FIG. 3, the views being taken along the line A (FIG. 4) and the line B (FIG. 5). The drawings illustrate cross-sectional views in the groove depth direction along the center narrow shallow grooves 321 (FIG. 4) and center bent grooves 322 (FIG. 5) described below.

As illustrated in FIG. 2, the center land portion 32 includes a plurality of the center narrow shallow grooves 321, a plurality of the center bent grooves 322, and a single circumferential narrow groove 323.

The center narrow shallow grooves 321 extend through the center land portion 32 in the tire width direction and are open to left and right edge portions of the center land portion 32. Additionally, the plurality of center narrow shallow grooves 321 are arranged at predetermined intervals in the tire circumferential direction. In such a configuration, heat build-up resistance performance of the tire is improved due to the cooling action of the center narrow shallow grooves 321.

Additionally, in the configuration of FIG. 2, the center narrow shallow groove 321 has a linear shape. However, no such limitation is intended, and the center narrow shallow groove 321 may have a gently curved arc shape or an S shape (not illustrated).

Additionally, in FIG. 3, a groove width W21 of the center narrow shallow groove 321 is preferably in the range $2.5 \text{ mm} \leq W21 \leq 7.5 \text{ mm}$ and more preferably in the range $4.0 \text{ mm} \leq W21 \leq 6.0 \text{ mm}$. Additionally, as illustrated in FIG. 3, the center narrow shallow groove 321 preferably has a substantially constant groove width. Specifically, the ratio of a maximum value W21_max and a minimum value W21_min of the groove width W21 of the center narrow shallow groove 321 is preferably in the range $1.00 \leq W21\_max/W21\_min \leq 1.10$.

As illustrated in FIG. 3, the center narrow shallow groove 321 extends in the tire width direction while inclining with respect to the tire circumferential direction. An inclination angle $\theta 21$ of the center narrow shallow groove 321 is preferably in the range $65° \leq \theta 21 \leq 90°$ and more preferably in the range $75° \leq \theta 21 \leq 85°$.

The inclination angle $\theta 21$ of center narrow shallow groove 321 is measured as an angle formed between the tire circumferential direction and an imaginary straight line passing through left and right opening portions of the center narrow shallow groove 321.

Additionally, in FIG. 3, a pitch length P21 of the center narrow shallow groove 321 is preferably in the range $0.75 \leq P21/Wb2 \leq 1.00$ and more preferably in the range $0.85 \leq P21/Wb2 \leq 0.90$ with respect to the ground contact width Wb2 of the center land portion 32.

Additionally, in FIG. 4, a groove depth H21 of the center narrow shallow groove 321 is in the range $0.025 \leq H21/Hg \leq 0.150$ and is preferably in the range $0.040 \leq H21/Hg \leq 0.060$ with respect to a maximum groove depth Hg of the circumferential main groove 2. The groove depth H21 of the center narrow shallow grooves 321 is preferably in the range $H21 \leq 5.0 \text{ mm}$. Consequently, the groove depth H21 of the center narrow shallow groove 321 is set very shallow with respect to the maximum groove depth Hg of the circumferential main groove 2.

In the configuration described above, the center narrow shallow grooves 321 having a very shallow groove depth H21 are disposed at predetermined intervals in the tire circumferential direction, and thus the progression of wear from the time when the tire is new is made uniform in the center land portion 32. As a result, the uneven wear resistance performance of the tire is improved.

As illustrated in FIG. 2, the center bent groove 322 has a bent shape or a curved shape, extends in the tire width direction, and is open to the circumferential main groove 2 at at least one end portion. Additionally, the plurality of center bent grooves 322 are arranged at predetermined intervals in the tire circumferential direction.

In the configuration of FIG. 2, the center bent groove 322 has a stepped shape including two bend points. In such a configuration, when the tire comes into contact with the ground, the groove walls of the center bent groove 322 engage with each other, thus ensuring the rigidity of the center land portion 32. However, no such limitation is intended, and the center bent groove 322 may have an S-shape including two inflection points (not illustrated).

Additionally, an extension length L22 (see FIG. 3) of the center bent groove 322 in the center land portion 32 in the tire width direction is preferably in the range $0.45 \leq L22/Wb2 \leq 0.65$ and more preferably in the range $0.50 \leq L22/Wb2 \leq 0.60$ with respect to the ground contact width Wb2 of the center land portion 32.

Additionally, in the configuration in FIG. 2, the center narrow shallow grooves 321 and the center bent grooves 322 are alternately arranged in the tire circumferential direction. However, no such limitation is intended, and the plurality of the center narrow shallow grooves 321 may be disposed between the center bent grooves 322 adjacent to each other (not illustrated).

Additionally, in the configuration of FIG. 2, the center land portion 32 includes the circumferential narrow groove 323 described below, and the center bent grooves 322 are disposed in each of left and right regions defined by the circumferential narrow groove 323. Additionally, the center bent grooves 322, 322 adjacent in the tire width direction are open at different positions with respect to the circumferential narrow groove 323. In other words, the center bent grooves 322, 322 adjacent in the tire width direction are connected via the circumferential narrow groove 323. However, no such limitation is intended, and the center bent grooves 322, 322 adjacent to each other may be open at an identical position in the tire circumferential direction with respect to the circumferential narrow groove 323 (not illustrated).

Additionally, in FIG. 3, a groove width W22 of the center bent groove 322 is preferably in the range $2.5 \text{ mm} \leq W22 \leq 7.5 \text{ mm}$ and more preferably in the range $4.0 \text{ mm} \leq W22 \leq 6.0 \text{ mm}$. Additionally, as illustrated in FIG. 3, the center bent groove 322 preferably has a substantially constant groove width in a region excluding widened portions 3222 at the bend points described below. Specifically, the ratio of a maximum value W22_max and a minimum value W22_min of the groove width W22 of the center bent groove 322 in the above-described region is preferably in the range $1.00 \leq W22\_max/W22\_min \leq 1.10$.

Additionally, as illustrated in FIG. 3, a distance De in the tire circumferential direction between an opening portion of the center narrow shallow groove 321 and an opening portion of the center bent groove 322 corresponding to the circumferential main groove 2 is preferably in the range $0.30 \leq De/P21 \leq 0.70$ and more preferably in the range $0.35 \leq De/P21 \leq 0.65$ with respect to the pitch length P21 of the center narrow shallow grooves 321.

Additionally, as illustrated in FIG. 3, the center bent groove 322 is open substantially orthogonally to the circumferential main groove 2. Specifically, the inclination angle (not illustrated) with respect to the tire circumferential direction of the groove center line at the opening portion of the center bent groove 322 corresponding to the circumferential main groove 2 is preferably in the range 70° or more and 110° or less, and more preferably in the range 80° or more and 100° or less. This suppresses a local reduction in the block rigidity of the opening portion of the center bent groove 322.

Additionally, in FIG. 5, a groove depth H22 of the center bent groove 322 is preferably in the range $0.50 \leq H22/Hg \leq 0.90$ and more preferably in the range $0.70 \leq H22/Hg \leq 0.85$ with respect to the maximum groove depth Hg of the circumferential main groove 2. Additionally, the groove depth H22 of the center bent groove 322 is preferably in the range 35 mm $\leq$ H22. Accordingly, the groove depth H22 of the center bent groove 322 is set deeper than the groove depth H21 of the center narrow shallow groove 321 described above.

Additionally, as illustrated in FIG. 3 and FIG. 5, the center bent groove 322 includes raised bottom portions 3221, 3221 respectively at the opening portion corresponding to the circumferential main groove 2 and at the opening portion corresponding to the circumferential narrow groove 323. Additionally, a distance H22' (see FIG. 5) from the tread contact surface to the top surface of the raised bottom portion 3221 of the center bent groove 322 is preferably in the range $0.025 \leq H22'/Hg \leq 0.150$ and more preferably in the range $0.040 \leq H22'/Hg \leq 0.060$ with respect to the maximum groove depth Hg of the circumferential main groove 2. Additionally, the distance H22' of the raised bottom portion 3221 is preferably in the range H22'$\leq$5.0 mm. Thus, the distance H22' of the raised bottom portion 3221 is set very shallow with respect to the maximum groove depth Hg of the circumferential main groove 2.

The distance H22' corresponds to the minimum groove depth of the center bent groove 322 and is measured as the minimum value of the distance from the tread contact surface to the top surface of the raised bottom portion 3221 of the center bent groove 322.

Additionally, in FIG. 3, an extension length L22' of the raised bottom portion 3221 of the center bent groove 322 in the tire width direction is preferably in the range $0.20 \leq L22'/Wb2 \leq 0.35$ with respect to the ground contact width Wb2 of the center land portion 32.

The extension length L22' of the raised bottom portion 3221 is measured in a region where the distance H22' of the raised bottom portion 3221 satisfies the condition for the above-described ratio H22'/Hg.

Additionally, in the configuration of FIG. 3, the center bent groove 322 has a stepped shape, and the groove center lines of both end portions of the center bent groove 322 are open orthogonally to the groove center lines of the circumferential main grooves 2 and the circumferential narrow groove 323 described below. The center bent groove 322 includes the raised bottom portions 3221 respectively in the left and right linear portions of the stepped shape. Accordingly, the opening portion of the center bent groove 322 corresponding to the circumferential main groove 2 is reinforced by a first raised bottom portion 3221, and the opening portion of the center bent groove 322 corresponding to the circumferential narrow groove 323 is reinforced by a second raised bottom portion 3221. This ensures the rigidity of the center land portion 32.

As illustrated in FIG. 2, the circumferential narrow groove 323 is disposed in the center portion of the center land portion 32 and extends in the tire circumferential direction. For example, in the configuration of FIG. 2, the single circumferential narrow groove 323 having a straight shape is disposed on the tire equatorial plane CL. However, no such limitation is intended, and the circumferential narrow groove 323 may be disposed in a position away from the tire equatorial plane CL (not illustrated). Specifically, in FIG. 3, the distance in the tire width direction (dimension symbol omitted in the drawings) from one edge portion of the center land portion 32 to the circumferential narrow groove 323 is in the range 40% to 60% with respect to the ground contact width Wb2 of the center land portion 32.

Additionally, in FIG. 3, a groove width W23 of the circumferential narrow groove 323 is preferably in the range 2.5 mm $\leq$ W23 $\leq$ 7.5 mm and more preferably in the range 4.0 mm $\leq$ W23 $\leq$ 6.0 mm. Additionally, as illustrated in FIG. 3, the circumferential narrow groove 323 preferably has a substantially constant groove width in a region excluding widened portions 3232 at the bend points described below. Specifically, the ratio of a maximum value W23_max and a minimum value W23_min of the groove width W23 of the circumferential narrow groove 323 in the above-described region is preferably in the range $1.00 \leq W23\_max/W23\_min \leq 1.10$.

Additionally, in FIG. 4, a maximum groove depth H23 of the circumferential narrow groove 323 is preferably in the range $0.70 \leq H23/Hg \leq 0.90$ and more preferably in the range $0.75 \leq H23/Hg \leq 0.85$ with respect to the maximum groove depth Hg of the circumferential main groove 2. Additionally, the groove depth H23 of the circumferential narrow groove 323 is preferably in the range 35 mm $\leq$ H23. Accordingly, the groove depth H23 of the circumferential narrow groove 323 is set deeper than the groove depth H21 of the center narrow shallow groove 321.

Additionally, as illustrated in FIGS. 3 and 5, the circumferential narrow groove 323 includes raised bottom portions 3231 at connection portions with the center bent grooves 322. Additionally, a distance H23' from the tread contact surface to the top surface of the raised bottom portion 3231 of the circumferential narrow groove 323 is preferably in the range $0.040 \leq H23'/H22 \leq 0.075$ and more preferably in the range $0.050 \leq H23'/H22 \leq 0.070$ with respect to the groove depth H22 of the center bent groove 322. Additionally, as illustrated in FIGS. 3 and 4, the raised bottom portion 3231 of the circumferential narrow groove 323 is disposed in a position away from a connection portion between the circumferential narrow groove 323 and the center narrow shallow groove 321.

Additionally, as illustrated in FIGS. 3 and 5, the raised bottom portion 3231 of the circumferential narrow groove 323 is connected to the raised bottom portions 3221 of the center bent grooves 322. This further increases the rigidity of the center land portion 32. Additionally, the distance H23' from the tread contact surface to the top surface of the raised bottom portion 3231 of the circumferential narrow groove 323 is preferably in the range $0.90 \leq H23'/H22' \leq 1.10$ and more preferably in the range $0.95 \leq H23'/H22' \leq 1.05$ with respect to the distance H22' of the raised bottom portion 3221 of the center bent groove 322. Accordingly, the top surface of the raised bottom portion 3231 of the circumferential narrow groove 323 and the top surface of the raised bottom portion 3221 of the center bent groove 322 are at a substantially identical depth position.

Widened Portions of Center Bent Groove and Circumferential Narrow Groove

Figure 6:
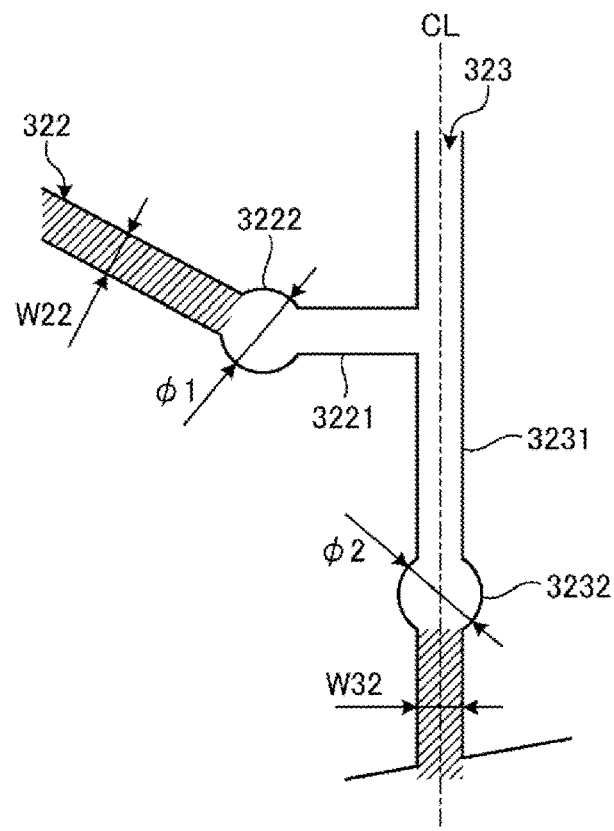
FIG. 6 is an enlarged view illustrating widened portions of center bent grooves and circumferential narrow grooves illustrated in FIG. 3.

FIG. 6 is an enlarged view illustrating the widened portions 3222, 3232 of the center bent groove 322 and the circumferential narrow groove 323 illustrated in FIG. 3. The same drawing illustrates an enlarged plan view of the connection portion between the center bent groove 322 and the circumferential narrow groove 323.

As illustrated in FIGS. 3 and 6, the center bent groove 322 includes the widened portion 3222 at the bend point of the bent shape. The widened portion 3222 has a circular shape as viewed in a tread plane, and widens the groove width of the center bent groove 322. Additionally, in the configuration of FIG. 3, the widened portion 3222 is formed at a raised portion (boundary portion with the deep groove portion) of the raised bottom portion 3221 of the center bent groove 322. Additionally, a diameter φ1 of the widened portion 3222 preferably has the relationship 1.05≤φ1/W22≤1.40 with respect to the groove width W22 of the center bent groove 322 at an identical position.

Additionally, as illustrated in FIGS. 3 and 6, the circumferential narrow groove 323 includes the widened portion 3232 at a raised portion (boundary portion with the deep groove portion) of the raised bottom portion 3231 of the circumferential narrow groove 323. The widened portion 3232 has a circular shape as viewed in a tread plane, and widens the groove width of the circumferential narrow groove 323. Additionally, a diameter φ2 of the widened portion 3232 preferably has the relationship 1.05≤φ2/W23≤1.40 with respect to the groove width W23 of the circumferential narrow groove 323 at an identical position.

Shoulder Land Portion

Figure 7:
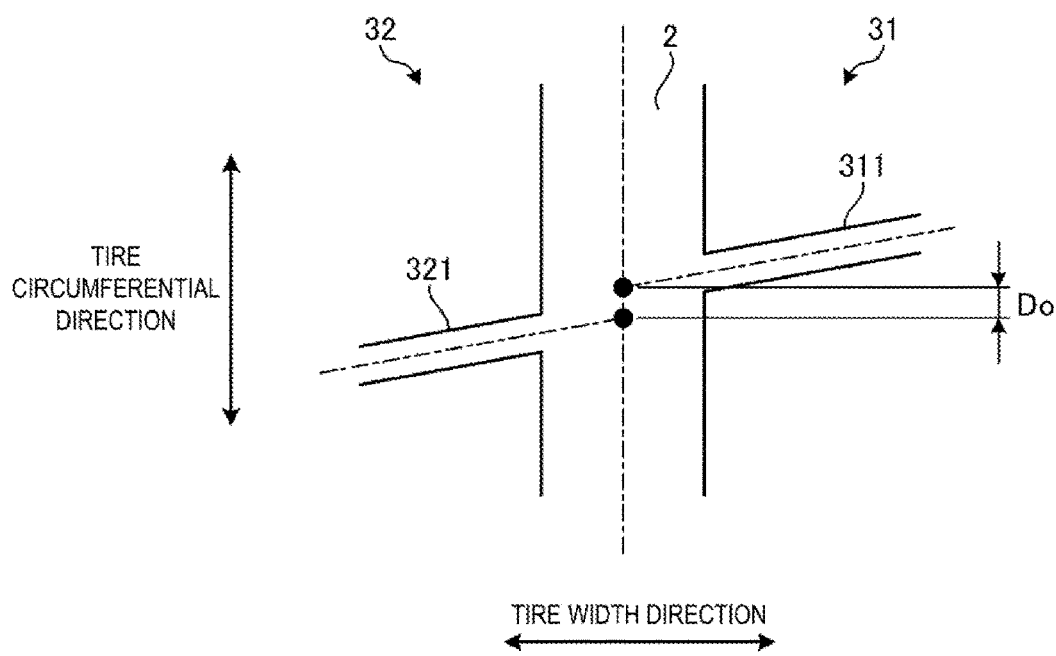
FIG. 7 is an enlarged view illustrating a main portion of the pneumatic tire illustrated in FIG. 2.

FIG. 7 is an enlarged view illustrating the main portion of the pneumatic tire illustrated in FIG. 2. The same drawing illustrates an enlarged plan view of the opening positions of the shoulder narrow shallow grooves 311 and the center narrow shallow grooves 321 with respect to the circumferential main groove 2.

As illustrated in FIG. 2, the shoulder land portion 31 includes a plurality of shoulder narrow shallow grooves 311 and a plurality of shoulder bent grooves 312.

The shoulder narrow shallow groove 311 extends through the shoulder land portion 31 in the tire width direction and is open to an edge portion of the shoulder land portion 31 on the circumferential main groove 2 side and open to the tire ground contact edge T. Additionally, the plurality of shoulder narrow shallow grooves 311 are arranged at predetermined intervals in the tire circumferential direction. In addition, in the configuration of FIG. 2, the shoulder narrow shallow groove 311 has a linear shape. However, no such limitation is intended, and the shoulder narrow shallow groove 311 may have a gently curved arc shape or an S shape (not illustrated).

Additionally, the groove width W11 (dimension symbol omitted in the drawings) of the shoulder narrow shallow groove 311 is in the range 2.5 mm≤W11≤7.5 mm. In addition, as illustrated in FIG. 2, the shoulder narrow shallow grooves 311 extends in the tire width direction while inclining with respect to the tire circumferential direction. Additionally, the inclination angle θ11 (dimension symbol omitted in the drawings) of the shoulder narrow shallow groove 311 is in the range 65°≤θ11≤90°. A groove depth H11 (dimension symbol omitted in the drawings) of the shoulder narrow shallow groove 311 is in the range 0.025≤H11/Hg≤0.150 with respect to the maximum groove depth Hg of the circumferential main groove 2. Additionally, the groove width W11, the inclination angle θ11, and the groove depth H11 of the shoulder narrow shallow groove 311 are preferably identical to the groove width W21, the inclination angle θ21, and the groove depth H21 of the center narrow shallow groove 321.

Additionally, in the configuration of FIG. 2, the shoulder narrow shallow grooves 311 in the left and right shoulder land portions 31, 31 are disposed on an extension line of the center narrow shallow groove 321. Thus, the shoulder narrow shallow grooves 311 and the center narrow shallow grooves 321 in all of the land portions 31, 32 are disposed on an identical straight line, forming long narrow shallow grooves (311, 321) that completely traverse the tire ground contact region. This improves the cooling action for the tread contact surface exerted by the shoulder narrow shallow grooves 311 and the center narrow shallow grooves 321, improving the heat build-up resistance of the tire.

Additionally, as illustrated in FIG. 7, the shoulder narrow shallow grooves 311 may be disposed slightly offset in the tire circumferential direction from the extension line of the center narrow shallow grooves 321. Specifically, in a case where a distance Do (see FIG. 7) between an intersection point between the extension line of the shoulder narrow shallow grooves 311 and the groove center line of the circumferential main groove 2 and an intersection point between the extension line of the center narrow shallow groove 321 and the groove center line of the circumferential main groove 2 is in the range 0≤Do/P21≤0.05 with respect to the pitch length P21 (see FIG. 3) of the center narrow shallow grooves 321, the shoulder narrow shallow grooves 311 are considered to be disposed on the extension line of the center narrow shallow grooves 321.

As illustrated in FIG. 2, the shoulder bent groove 312 has a bent shape or a curved shape, extends through the shoulder land portions 31 in the tire width direction, and is open to an edge portion of the shoulder land portion 31 on the circumferential main groove 2 side and open to the tire ground contact edge T. Additionally, the plurality of shoulder bent grooves 312 are arranged at a predetermined interval in the tire circumferential direction. Additionally, in the configuration of FIG. 2, the shoulder bent groove 312 has a stepped shape including two bend points. However, no such limitation is intended, and the shoulder bent groove 312 may have an S shape including two inflection points (not illustrated).

Additionally, a groove width W12 (dimension symbol omitted in the drawings) of the shoulder bent groove 312 is in the range 2.5 mm≤W12≤7.5 mm. Additionally, the maximum groove depth H12 (dimension symbol omitted in the drawings) of the shoulder bent groove 312 is in the range 0.025≤H12/Hg≤0.150 with respect to the maximum groove depth Hg of the circumferential main groove 2. Additionally, the groove width W12 and the maximum groove depth H12 of the shoulder bent grooves 312 in the shoulder land portion 31 are preferably identical to the groove width W21 and the groove depth H21 of the center narrow shallow groove 321 of the center land portion 32.

MODIFIED EXAMPLES

Figure 8:
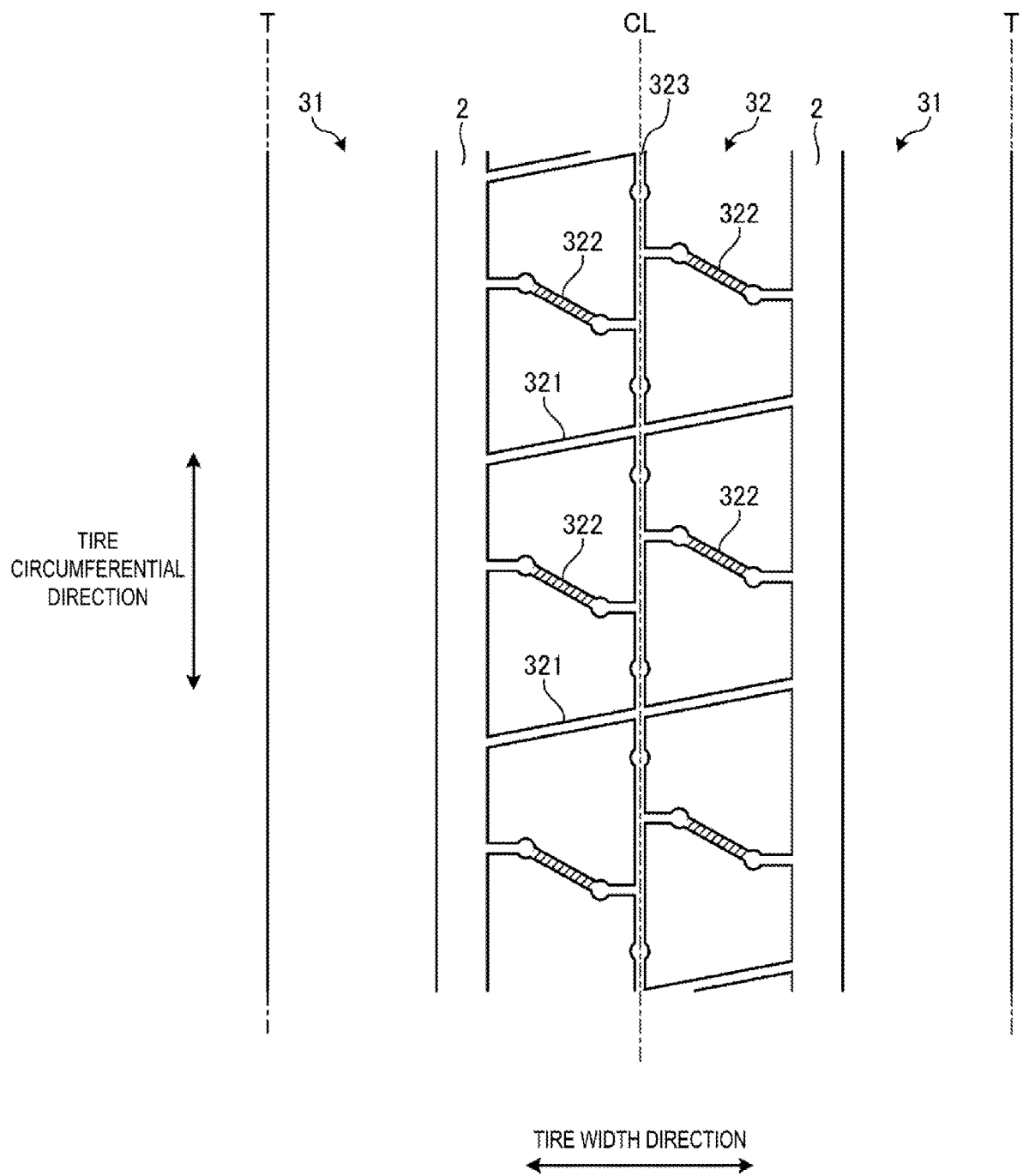
FIG. 8 is an explanatory diagram illustrating a modified example of the pneumatic tire illustrated in FIG. 2.
Figure 9:
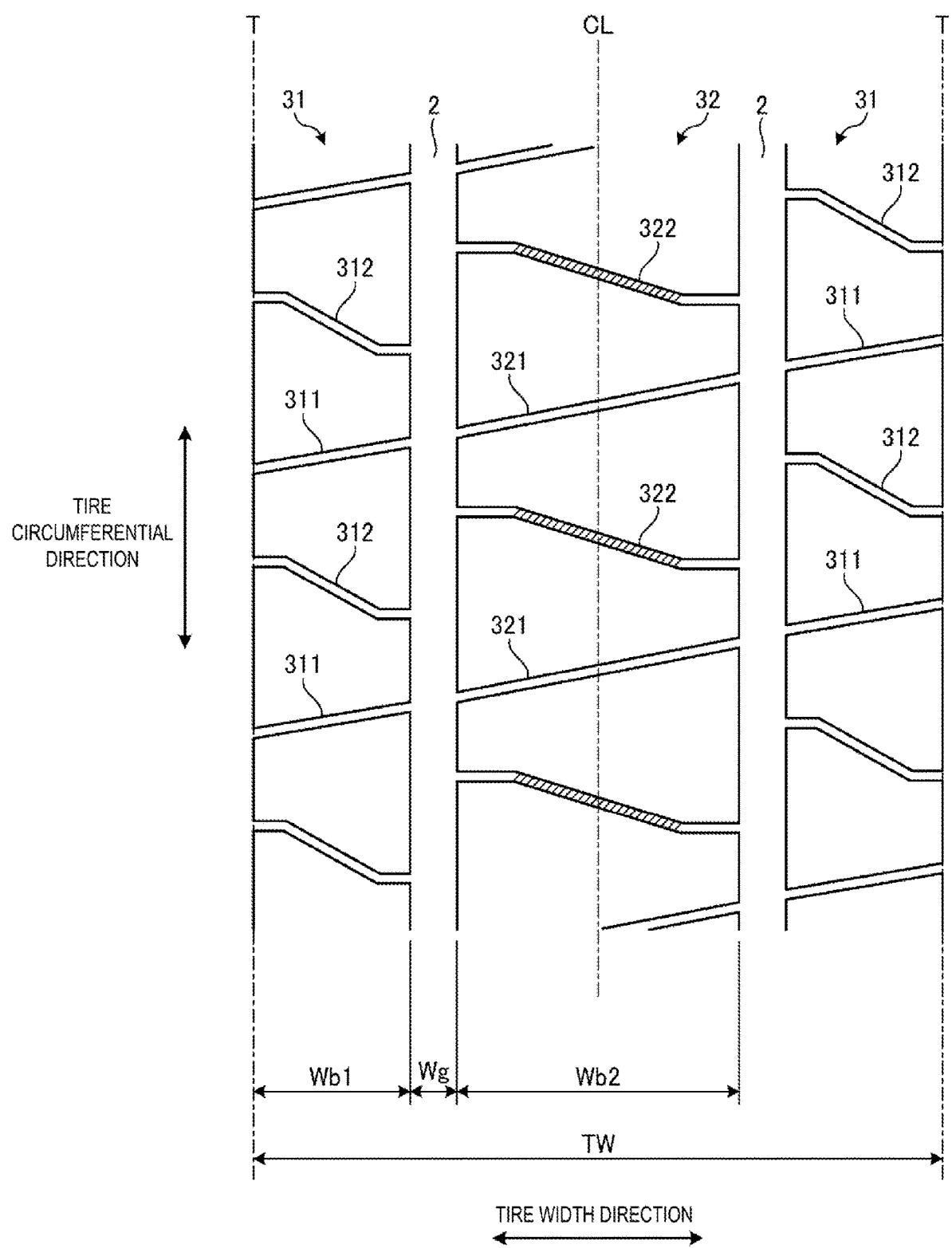
FIG. 9 is an explanatory diagram illustrating a modified example of the pneumatic tire illustrated in FIG. 2.
Figure 10:
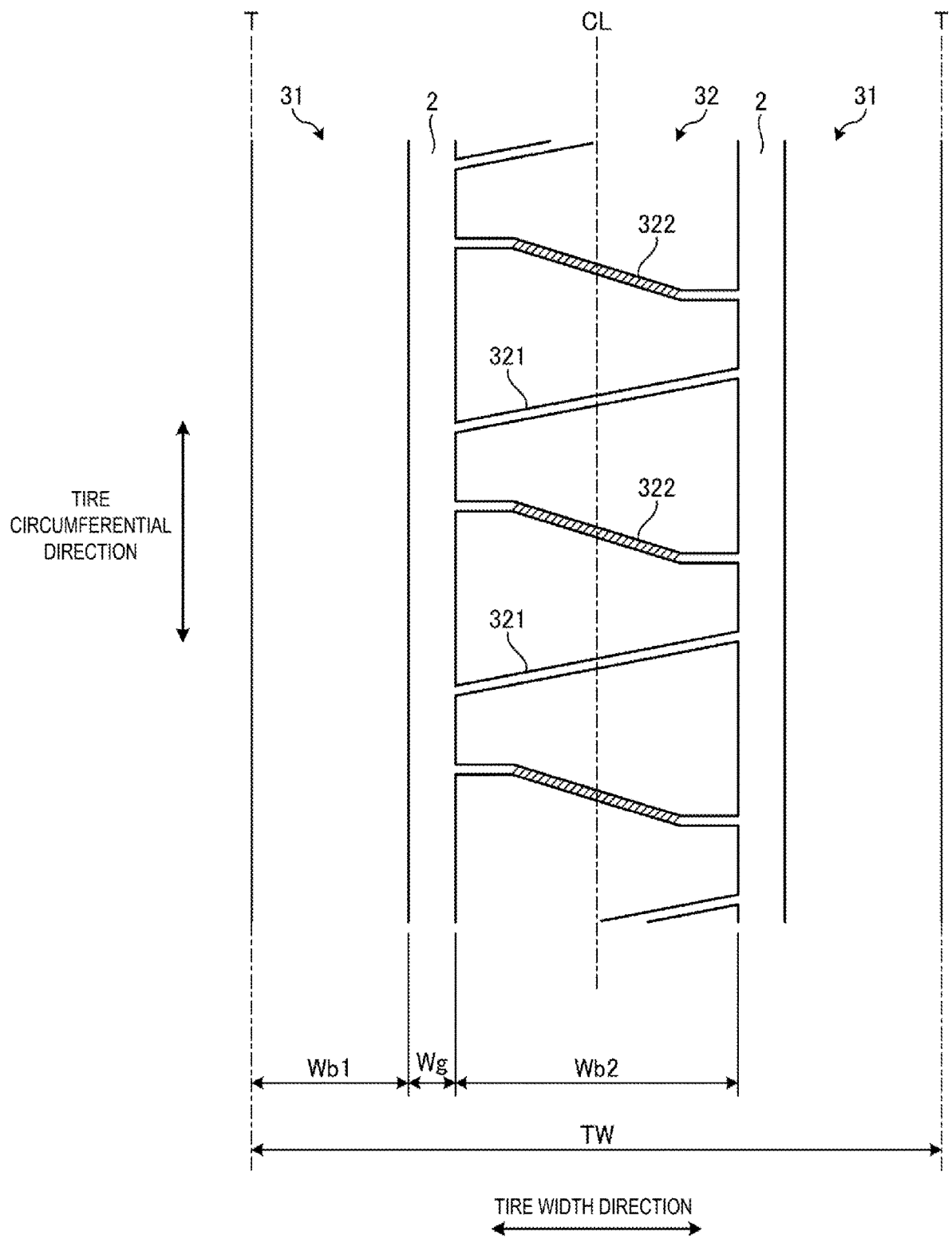
FIG. 10 is an explanatory diagram illustrating a modified example of the pneumatic tire illustrated in FIG. 2.

FIGS. 8 to 10 are explanatory diagrams illustrating modified examples of the pneumatic tire illustrated in FIG. 2. In these drawings, constituents that are the identical to constituents illustrated in FIG. 2 have the identical reference signs, and explanations thereof are omitted.

In the configuration of FIG. 2, as described above, the shoulder land portion 31 includes the plurality of shoulder narrow shallow grooves 311 and the plurality of shoulder bent grooves 312. In such a configuration, the shoulder narrow shallow grooves 311 and the shoulder bent grooves 312 effectively cool the tread contact surface to improve the heat build-up resistance of the tire.

However, no such limitation is intended, and as illustrated in FIG. 8, the shoulder narrow shallow grooves 311 and the shoulder bent grooves 312 may be omitted. In the configuration of FIG. 8, the shoulder land portion 31 includes no grooves but includes a road contact surface extending continuously in the tire circumferential direction.

Additionally, in the configuration of FIGS. 2 and 8, as described above, the center land portion 32 includes the circumferential narrow groove 323, and the center bent grooves 322 are disposed in the left and right regions defined by the circumferential narrow groove 323. Additionally, the center bent grooves 322, 322 adjacent in the tire width direction are open at different positions with respect to the circumferential narrow groove 323. Such a configuration is preferable because the heat build-up resistance performance of the tire is improved by the cooling action of the circumferential narrow groove 323.

However, no such limitation is intended, and as illustrated in FIGS. 9 and 10, the circumferential narrow groove 323 may be omitted. In the configuration of FIGS. 9 and 10, the center narrow shallow grooves 321 and the center bent grooves 322 extend through the center land portion 32 in the tire width direction, defining the center land portion 32 in the tire circumferential direction. Additionally, the regions defined by the center narrow shallow grooves 321 and the center bent grooves 322 include road contact surfaces extending continuously in the tire width direction. In this configuration, the center land portion 32 has a continuous road contact surface in the tire width direction, thus increasing the rigidity of the center land portion 32 to improve the uneven wear resistance performance of the tire. In addition, the center narrow shallow grooves 321 and the center bent grooves 322 with different maximum depths H21, H22 (FIGS. 4 and 5) are disposed in the tire circumferential direction, and thus compared to a configuration in which only deep grooves are disposed, the above-described configuration increases the rigidity of the center land portion 32 to improve the uneven wear resistance performance of the tire.

Effect

As described above, the pneumatic tire 1 includes the plurality of circumferential main grooves 2, 2 extending in the tire circumferential direction and the pair of shoulder land portions 31, 31 and the single center land portion 32 defined and formed by the circumferential main grooves 2, 2 (see FIGS. 2, 8, 9, and 10). In addition, the center land portion 32 includes the plurality of center narrow shallow grooves 321 extending through the center land portion 32 in the tire width direction. Additionally, the groove depth H21 of the center narrow shallow groove 321 is in the range $0.025 \leq H21/Hg \leq 0.150$ with respect to the maximum groove depth Hg of the circumferential main groove 2 (see FIG. 4).

In such a configuration, (1) disposing the single center land portion 32 increases the rigidity of the tread portion, reducing lateral swaying of the vehicle. This has the advantage of suppressing uneven wear caused by lateral swaying to improve uneven wear resistance performance of the tire. Additionally, (2) the center land portion 32 includes the plurality of center narrow shallow grooves 321 extending through the center land portion 32, and thus there is an advantage that the cooling action of the center narrow shallow grooves 321 improves the heat build-up resistance performance of the tire. In addition, (3) there is an advantage that the above-described lower limit of the ratio H21/Hg ensures the cooling action of the center narrow shallow grooves 321, whereas the above-described upper limit of the ratio H21/Hg ensures the rigidity of the tread portion. Additionally, (4) the center narrow shallow grooves 321 having the very shallow groove depth H21 are disposed at predetermined intervals in the tire circumferential direction, and thus the progression of wear from the time when the tire is new is made uniform in the center land portion 32. This has the advantage that the uneven wear resistance performance of the tire is improved.

Additionally, in the pneumatic tire 1, the center narrow shallow groove 321 has the groove width W21 (see FIG. 3) of 2.5 mm or more and the groove depth H21 (see FIG. 4) of 5.0 mm or less. This has the advantage of properly ensuring the groove width W21 and the groove depth H21 of the center narrow shallow groove 321.

Additionally, in the pneumatic tire 1, the ratio between the maximum value W21_max and the minimum value W21_min of the groove width W21 (see FIG. 3) of the center narrow shallow groove 321 is in the range $1.00 \leq W21\_max/W21\_min \leq 1.10$. In such a configuration, the center narrow shallow groove 321 has a substantially constant groove width, and thus there is an advantage that the rigidity of the center land portion 32 is made uniform, improving the uneven wear resistance performance of the tire.

Additionally, in the pneumatic tire 1, the ground contact width Wb2 of the center land portion 32 has the relationship $0.35 \leq Wb2/TW \leq 0.50$ with respect to the tire ground contact width TW (see FIG. 2). There is an advantage that the above-described lower limit ensures the ground contact width Wb2 of the center land portion 32, ensuring the uneven wear resistance performance for uneven wear caused by the lateral swaying of the mounting vehicle. In addition, there is an advantage that the above-described upper limit properly ensures the ground contact width Wb1 of the left and right shoulder land portions 31, 31.

Additionally, in the pneumatic tire 1, the center land portion 32 includes the center bent grooves 322 having a bent shape or a curved shape and being open to the circumferential main groove 2 at at least one end portion (see FIG. 2). Additionally, the groove depth H22 of the center bent groove 322 is in the range $0.50 \leq H22/Hg \leq 0.90$ with respect to the maximum groove depth Hg of the circumferential main groove 2 (see FIG. 5). In such a configuration, the center land portion 32 includes the center bent grooves 322, and thus there is an advantage that the cooling action of the center bent grooves 322 improves the heat build-up resistance performance of the tire. Additionally, the groove depth H22 of the center bent groove 322 is greater than the groove depth H21 of the center narrow shallow groove 321 described above, and thus there is an advantage that the cooling action of the center bent grooves 322 effectively improves the heat build-up resistance performance of the tire.

Additionally, in the pneumatic tire 1, the center bent groove 322 has a linear shape (see FIG. 2), an arc shape, or an S shape (not illustrated). Additionally, the extension length L22 (see FIG. 3) of the center bent groove 322 in the tire width direction is in the range $0.45 \leq L22/Wb2 \leq 0.65$ with respect to the ground contact width Wb2 of the center land portion 32. There is an advantage that the above-described lower limit ensures the cooling action for the land portions exerted by the center bent grooves 322, ensuring the heat build-up resistance performance of the tire. Additionally, there is an advantage that the above-described upper limit ensures the rigidity of the land portion, ensuring the uneven wear resistance performance of the tire.

Additionally, in the pneumatic tire 1, the center bent groove 322 includes the raised bottom portion 3221 at the opening portion corresponding to the circumferential main groove 2 (see FIGS. 3 and 5). This has the advantage of ensuring the rigidity of the center land portion 32 to improve the uneven wear resistance performance of the tire.

Additionally, in the pneumatic tire 1, the distance H22' from the tread contact surface to the top surface of the raised bottom portion 3221 of the center bent groove 322 is in the range $0.025 \leq H22'/Hg \leq 0.150$ with respect to the maximum groove depth Hg of the circumferential main groove 2 (see FIG. 5). There is an advantage that the above-described lower limit ensures the cooling action for the land portions exerted by the center bent grooves 322. Additionally, there is an advantage that the above-described upper limit ensures reinforcing action for the rigidity of the land portion exerted by the raised bottom portion 3221.

Additionally, in the pneumatic tire 1, at least one center narrow shallow groove 321 is disposed between the center bent grooves 322, 322 adjacent to each other (see FIG. 2). Thus, there is an advantage that the cooling action for the land portions exerted by the center narrow shallow grooves 321 and the center bent grooves 322 can be efficiently improved with the rigidity of the land portion maintained.

Additionally, in the pneumatic tire 1, the center land portion 32 includes the circumferential narrow grooves 323 extending in the tire circumferential direction (see FIG. 2). Additionally, the groove depth H23 of the circumferential narrow groove 323 is in the range $0.70 \leq H23/Hg \leq 0.90$ with respect to the maximum groove depth Hg of the circumferential main groove 2. In such a configuration, the center land portion 32 includes the circumferential narrow grooves 323, and thus there is an advantage that the cooling action of the circumferential narrow groove 323 improves the heat build-up resistance performance of the tire. Additionally, the groove depth H23 of the circumferential narrow groove 323 is deeper than the groove depth H21 of the center narrow shallow groove 321 described above, and thus there is an advantage that the cooling action of the circumferential narrow groove 323 effectively improves the heat build-up resistance performance of the tire.

Additionally, in the pneumatic tire 1, the center land portion 32 includes the circumferential narrow groove 323 extending in the tire circumferential direction, and the center bent grooves 322 having a bent shape or curved shape and being open to the circumferential narrow groove 323 at one end portion (see FIG. 2). Additionally, the circumferential narrow groove 323 includes the raised bottom portion 3231 at the opening portion corresponding to the center bent groove 322. This has the advantage of ensuring the rigidity of the center land portion 32 to improve the uneven wear resistance performance of the tire.

Additionally, in the pneumatic tire 1, the shoulder land portion 31 includes the plurality of shoulder narrow shallow grooves 311 extending through the shoulder land portion 31 in the tire width direction (see FIG. 2). In addition, the groove depth H11 of the shoulder narrow shallow groove 311 is in the range $0.025 \leq H11/Hg \leq 0.150$ with respect to the maximum groove depth Hg of the circumferential main groove 2. In such a configuration, the shoulder land portion 31 includes the plurality of shoulder narrow shallow grooves 311 extending through the shoulder land portions 31, and thus there is an advantage that the cooling action of the shoulder narrow shallow grooves 311 improves the heat build-up resistance performance of the tire. Additionally, there is an advantage that the above-described lower limit of the ratio H11/Hg ensures the cooling action of the shoulder narrow shallow grooves 311, whereas the above-described upper limit of the ratio H11/Hg ensures the rigidity of the tread portion.

Additionally, in the pneumatic tire 1, the shoulder narrow shallow grooves 311 are located on the extension line of the center narrow shallow grooves 321 (see FIG. 2). This has the advantages of enhancing the cooling action for the tread contact surface exerted by the shoulder narrow shallow grooves 311 and the center narrow shallow grooves 321, improving the heat build-up resistance of the tire.

Additionally, in the pneumatic tire 1, the pair of circumferential main grooves 2 have a straight shape (see FIG. 2). Additionally, the groove width Wg of the circumferential main groove 2 is in the range $0.05 \leq Wg/TW \leq 0.10$ with respect to the tire ground contact width TW. In such a configuration, the circumferential main groove 2 has a straight shape, and thus there is an advantage that the cooling action for the tread contact surface is enhanced, improving the heat build-up resistance of the tire.

Target of Application

In addition, the pneumatic tire 1 is a construction vehicle tire, and in particular, the pneumatic tire 1 is preferably a construction vehicle tire mounted on a port straddle carrier. Thus, in a case where such a construction vehicle tire is a target of application, there is an advantage that improving action for the uneven wear resistance performance and the heat build-up resistance performance of the tire is effectively exerted.

EXAMPLES

FIGS. 11 and 12 are tables showing the results of performance tests of pneumatic tires according to embodiments of the technology.

In the performance tests, (1) heat build-up resistance performance and (2) uneven wear resistance performance were evaluated for a plurality of types of test tires. Additionally, the test tires having a tire size of 1600R25 are mounted on rims having a rim size of 25×11.25–2.0, and an internal pressure of 1000 kPa and 85% of a load specified by JATMA are applied to the test tires.

(1) In the evaluation of heat build-up resistance performance, an indoor drum testing machine was used, and the amount of heat generated by the tire was measured after traveling at a speed of 25 km/h for four hours. The measurement results are expressed as index values and evaluated with Conventional Example being assigned as the reference (100). In this evaluation, larger values are preferable.

(2) In the evaluation of uneven wear resistance performance, the test tires were mounted on all the wheels of the port straddle carrier used as the test vehicle. Then, uneven wear of the tire was observed after the test vehicle traveled on a paved road at a speed of 25 km/h for 3000 hours. The measurement results are expressed as index values and evaluated with Conventional Example being assigned as the reference (100). In this evaluation, larger values are preferable. Additionally, in a case where the index value is 98 or higher in the evaluation, the uneven wear resistance performance is considered to be properly ensured.

The test tires of Examples each include the configuration of FIG. 2, and each include the pair of circumferential main grooves 2, 2 having a straight shape, the pair of shoulder land portions 31, 31, and the single center land portion 32. Additionally, the center land portion 32 includes the center narrow shallow grooves 321 extending through the center land portion 32. In addition, the tire ground contact width TW is 360 mm, and the groove depth Hg of the circumferential main groove 2 is 50 mm.

The test tire of Conventional Example corresponds to the test tire of Example 1 in which the center land portion includes no narrow shallow groove but includes a plane road contact surface.

The test results indicate that the test tires of Examples allow the heat build-up resistance performance of the tire to be improved while maintaining the uneven wear resistance performance of the tire.

The invention claimed is:

1. A pneumatic tire comprising:
   a pair of circumferential main grooves extending in a tire circumferential direction, and
   a pair of shoulder land portions and a single center land portion defined and formed by the circumferential main grooves,
   the center land portion comprising a plurality of center narrow shallow grooves extending through the center land portion in a tire width direction,
   a groove depth H21 of the center narrow shallow groove being in a range $0.025 \leq H21/Hg \leq 0.150$ with respect to a maximum groove depth Hg of the circumferential main groove,
   the center land portion comprising a plurality of center narrow shallow grooves extending through the center land portion in a tire width direction and connected to the pair of circumferential main grooves, and
   the center narrow shallow groove having a groove width W21 of 2.5 mm or more and the groove depth H21 of 5.0 mm or less; wherein
   the center land portion comprises center bent grooves having a bent shape or a curved shape and being open to the circumferential main groove at at least one end portion,
   a groove depth H22 of the center bent grooves is in a range $0.50 \leq H22/Hg \leq 0.90$ with respect to the maximum groove depth Hg of the circumferential main groove,
   the center bent grooves have a linear shape, an arc shape, or an S shape, and
   an extension length L22 of the center bent grooves in the tire width direction is in a range $0.45 \leq L22/Wb2 \leq 0.65$ with respect to a ground contact width Wb2 of the center land portion.

2. The pneumatic tire according to claim 1, wherein a ratio of a maximum value W21_max and a minimum value W21_min of the groove width W21 of the center narrow shallow groove is in a range $1.00 \leq W21\_max/W21\_min \leq 1.10$.

3. The pneumatic tire according to claim 1, wherein a ground contact width Wb2 of the center land portion has a relationship $0.35 \leq Wb2/TW \leq 0.50$ with respect to a tire ground contact width TW.

4. The pneumatic tire according to claim 1, wherein at least one of the center narrow shallow grooves is disposed between the center bent grooves adjacent to each other.

5. The pneumatic tire according to claim 1, wherein
   the center land portion comprises a circumferential narrow groove extending in the tire circumferential direction, and
   a groove depth H23 of the circumferential narrow groove is in a range $0.70 \leq H23/Hg \leq 0.90$ with respect to the maximum groove depth Hg of the circumferential main groove.

6. The pneumatic tire according to claim 1, wherein
   the center land portion comprises a circumferential narrow groove extending in the tire circumferential direction and the center bent grooves being open to the circumferential narrow groove at one end portion, and
   the center bent grooves comprise a raised bottom portion at an opening portion corresponding to the circumferential narrow groove.

7. The pneumatic tire according to claim 1, wherein
   the pair of circumferential main grooves comprises a straight shape, and
   a groove width Wg of the circumferential main groove is in a range $0.05 \leq Wg/TW \leq 0.10$ with respect to a tire ground contact width TW.

8. The pneumatic tire according to claim 1, wherein the pneumatic tire is a construction vehicle tire.

9. The pneumatic tire according to claim 1, wherein the center bent grooves comprise a raised bottom portion at an opening portion corresponding to the circumferential main groove.

10. The pneumatic tire according to claim 9, wherein a distance H22' from a tread contact surface to a top surface of the raised bottom portion of the center bent grooves is in a range $0.025 \leq H22'/Hg \leq 0.150$ with respect to the maximum groove depth Hg of the circumferential main groove.

11. The pneumatic tire according to claim 1, wherein
    the shoulder land portion comprises a plurality of shoulder narrow shallow grooves extending through the shoulder land portion in the tire width direction, and
    a groove depth H11 of the shoulder narrow shallow groove is in a range $0.025 \leq H11/Hg \leq 0.150$ with respect to the maximum groove depth Hg of the circumferential main groove.

12. The pneumatic tire according to claim 11, wherein the shoulder narrow shallow grooves are located on an extension line of the center narrow shallow grooves.

13. A pneumatic tire comprising:
    a pair of circumferential main grooves extending in a tire circumferential direction, and
    a pair of shoulder land portions and a single center land portion defined and formed by the circumferential main grooves,
    the center land portion comprising a plurality of center narrow shallow grooves extending through the center land portion in a tire width direction,
    a groove depth H21 of the center narrow shallow groove being in a range $0.025 \leq H21/Hg \leq 0.150$ with respect to a maximum groove depth Hg of the circumferential main groove,
    the center land portion comprising a plurality of center narrow shallow grooves extending through the center land portion in a tire width direction and connected to the pair of circumferential main grooves, and
    the pneumatic tire being a construction vehicle tire; wherein
    the center land portion comprises center bent grooves having a bent shape or a curved shape and being open to the circumferential main groove at at least one end portion,
    a groove depth H22 of the center bent grooves is in a range $0.50 \leq H22/Hg \leq 0.90$ with respect to the maximum groove depth Hg of the circumferential main groove, the center bent grooves have a linear shape, an arc shape, or an S shape, and an extension length L22 of the center bent grooves in the tire width direction is in a range $0.45 \leq L22/Wb2 \leq 0.65$ with respect to a ground contact width Wb2 of the center land portion.

14. A pneumatic tire comprising:

a pair of circumferential main grooves extending in a tire circumferential direction, and a pair of shoulder land portions and a single center land portion defined and formed by the circumferential main grooves, the center land portion comprising a plurality of center narrow shallow grooves extending through the center land portion in a tire width direction, a groove depth H21 of the center narrow shallow groove being in a range $0.025 \leq H21/Hg \leq 0.150$ with respect to a maximum groove depth Hg of the circumferential main groove, the center land portion comprising a circumferential narrow groove extending in the tire circumferential direction, and a groove depth H23 of the circumferential narrow groove being in a range $0.70 \leq H23/Hg \leq 0.90$ with respect to the maximum groove depth Hg of the circumferential main groove.

15. A pneumatic tire comprising:

a pair of circumferential main grooves extending in a tire circumferential direction, and a pair of shoulder land portions and a single center land portion defined and formed by the circumferential main grooves, the center land portion comprising a plurality of center narrow shallow grooves extending through the center land portion in a tire width direction, a groove depth H21 of the center narrow shallow groove being in a range $0.025 \leq H21/Hg \leq 0.150$ with respect to a maximum groove depth Hg of the circumferential main groove, the center land portion comprising center bent grooves having a bent shape or a curved shape and being open to the circumferential main groove at at least one end portion, a groove depth H22 of the center bent grooves being in a range $0.50 \leq H22/Hg \leq 0.90$ with respect to the maximum groove depth Hg of the circumferential main groove, and the center bent grooves comprising a raised bottom portion at an opening portion corresponding to the circumferential main groove.

16. A pneumatic tire comprising:

a pair of circumferential main grooves extending in a tire circumferential direction, and a pair of shoulder land portions and a single center land portion defined and formed by the circumferential main grooves, the center land portion comprising a plurality of center narrow shallow grooves extending through the center land portion in a tire width direction, a groove depth H21 of the center narrow shallow groove being in a range $0.025 \leq H21/Hg \leq 0.150$ with respect to a maximum groove depth Hg of the circumferential main groove, the center land portion comprising a circumferential narrow groove extending in the tire circumferential direction and center bent grooves having a bent shape or a curved shape and being open to the circumferential narrow groove at one end portion, and the center bent grooves comprising a raised bottom portion at an opening portion corresponding to the circumferential narrow groove.

\* \* \* \* \*